Sept. 19, 1933.  F. H. B. STELZER  1,927,138

PROCESS AND APPARATUS FOR FEEDING PREDETERMINED AMOUNT OF TOBACCO

Original Filed Dec. 19, 1929   6 Sheets-Sheet 1

Inventor
Franz Heinrich Benno Stelzer
Attorneys
Langner, Parry, Card & Langner.

Sept. 19, 1933.  F. H. B. STELZER  1,927,138
PROCESS AND APPARATUS FOR FEEDING PREDETERMINED AMOUNT OF TOBACCO
Original Filed Dec. 19, 1929   6 Sheets-Sheet 2

Inventor
Franz Heinrich Benno Stelzer
Attorneys
Langner, Parry, Card & Langner

Sept. 19, 1933.  F. H. B. STELZER  1,927,138
PROCESS AND APPARATUS FOR FEEDING PREDETERMINED AMOUNT OF TOBACCO
Original Filed Dec. 19, 1929   6 Sheets-Sheet 4

Inventor
Franz Heinrich Benno Stelzer
Attorneys
Langner, Parry, Card & Langner

Sept. 19, 1933.                F. H. B. STELZER                1,927,138
PROCESS AND APPARATUS FOR FEEDING PREDETERMINED AMOUNT OF TOBACCO
                Original Filed Dec. 19, 1929    6 Sheets-Sheet 5

Inventor
Franz Heinrich Benno Stelzer
Attorneys
Langner, Parry, Card & Langner.

Patented Sept. 19, 1933

1,927,138

UNITED STATES PATENT OFFICE 1,927,138

PROCESS AND APPARATUS FOR FEEDING PREDETERMINED AMOUNT OF TOBACCO

Franz Heinrich Benno Stelzer, Dresden, Germany, assignor to Universelle Cigarettenmaschinen Fabrik, J. C. Muller & Company, Dresden, Germany Application December 19, 1929, Serial No. 415,295, and in Great Britain November 15, 1929. Renewed August 5, 1933

6 Claims. (Cl. 131—39)

This invention has for its main object to provide a new and improved process and apparatus for detaching a predetermined amount of cut tobacco from a supply of cut tobacco and then transferring the same to a position where it is to be further operated upon.

A further object is to provide means whereby the quantity of the tobacco removed is always maintained uniform with respect to the quantity and density, since in the manufacture of cigars and cigarettes it is highly essential that the portion constituting the fillers should always remain identical.

Another object of this invention consists in bringing a properly formed suction head into a tobacco supply and by proper adjustment of the air suction regulating the amount of tobacco picked up necessary for forming one filler and then carrying the same along by the suction head and delivering it at the working point by means of a periodic disconnection of the air suction.

It has been found that in this manner a quantity of tobacco which always remains constant can be separated from the cut tobacco supply. Particularly if the tobacco supply has been spread out into an intimately uniform layer having a smoothed surface at the point where the suction head intake takes place, and upon which the flat chambered suction head seats itself, whereupon the layer of tobacco carried along by the suction head upon its way to the point of delivery is still further smoothed off by special scrapers.

It is a further object of the invention to provide a hollow vessel having an upwardly directed opening which can be moved upwardly through the material and later returned to the original position whereby a quantity of the material operated upon can be taken from the vessel after the same has been lifted above the material.

It is a further object of the invention to provide means which will operate after the material has been detached so as to reduce the amount detached to exactly the predetermined quantity.

An important object of the invention is to utilize pneumatic means for both detaching the desired quantity of material and also transporting the same to the desired position.

A further object is to provide means directly operated upon the detaching vessel to ensure a uniform density of the material detached from the supply.

It is also an object of the invention to provide means for constantly mixing and smoothing the material operated upon so as to assist in the separation of the desired amounts.

A further object is to provide means whereby a thorough mixing of the material is accomplished prior to each separation of the predetermined amounts of material therefrom.

For a more specific description of the invention attention is directed to the following detailed description taken in connection with the figures upon the drawings, in which

Fig. 19 is a top view of modification shown in Fig. 18, Figs. 20 and 21 are vertical cross sections of a further modification in various working positions of the hollow vessel, and Figs. 22 and 23 are detail views.

Figure 1:
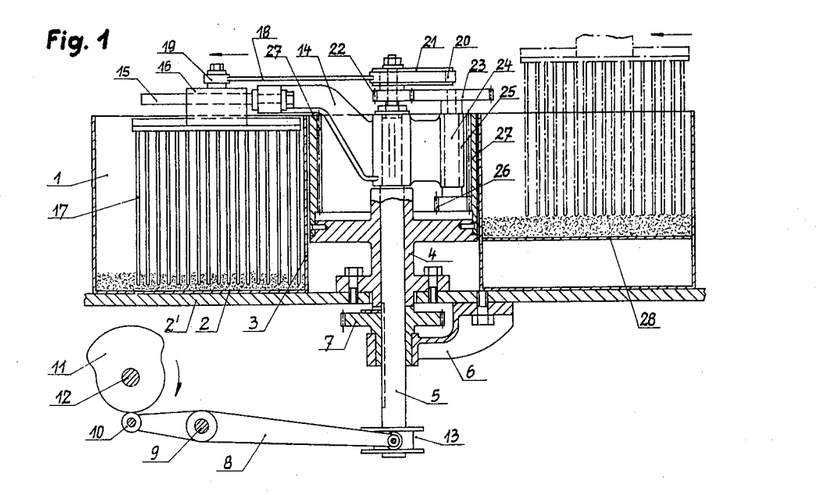
Fig. 1 shows the tobacco container with the rakes operating therein in vertical cross section.

The cut tobacco which is intended for the forming of the cigar or cigarette filler is located in a cylindrical container 1, whose bottom 2 is stationary, and in the middle a circular chamber is formed by the concentric wall 3 of the container. In this chamber a supporting element 4 is secured by screw means upon the supporting plate 2' of the container, and in which the vertical shaft 5 is centrally longitudinally shiftable and rotatable. The rotation of this shaft is accomplished by means of a spur gear 7 keyed thereto and supported in a bearing 6 fastened to the under side of the supporting plate 2', which gear is in mesh with spur driving gears not shown. The raising and lowering of the shaft 5 during its rotation takes place by means of a control lever 8 which is pivotally supported at 9 in the frame, and one end of which, provided with a roller 10, is in engagement with a cam 11, which is secured to the driven shaft 12 and rotates in the direction of the arrow. The other forked end of the control lever 8 engages in a circular groove 13 provided at the lower end of the shaft 5. A supporting arm 14 is keyed to the shaft and terminates in two parallel bars 15. A slide 16 is guided upon these bars, to which is fastened a rake 17, the prongs of which project vertically downward. The length of the rake is less than the width of the annular space of the container 1, so that a radial shifting of the rake is possible with the aid of the carriage 16 which slides upon the rods 15. This radial shifting is produced by having a rod 18 engaging the carriage 16 pivotally at 19, the ring 20 upon rod 18 surrounds an eccentric disc 21 set so as to be freely rotatable upon the upper end of the shaft 5. The eccentric disc 21 has integral therewith a spur wheel 22 projecting downwardly. The spur wheel 22 is in mesh with spur wheel 23, the vertical shaft 24 of which is supported in a bearing 25 which is carried by the same supporting element as carries the supporting arm 14. Upon the lower end of the shaft 24 is secured a spur wheel 26, which is in mesh with the internal teeth upon cylinder 27 which is arranged rigidly upon the supporting element 4. In this manner upon the rotation of the shaft 5, a rapid to-and-fro motion of the slide 16 takes place.

Figure 2:
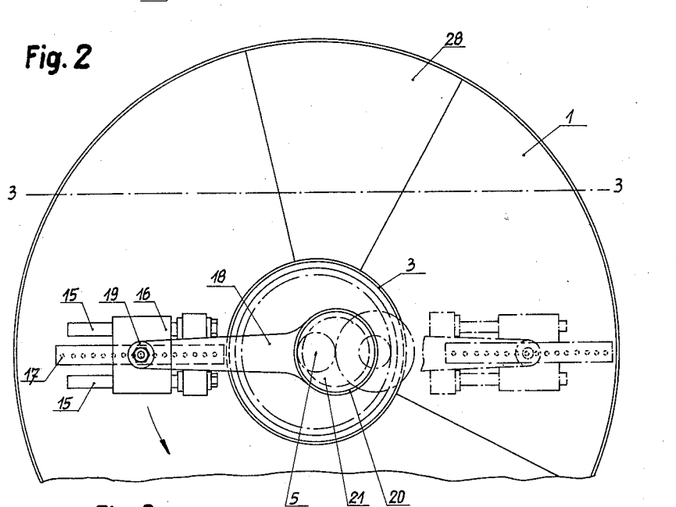
Fig. 2 is a top view of the tobacco container.

As clearly shown, the teeth of the rake project close to the bottom of the container 1. The rake will, therefore, upon rotation in the direction of the arrow in Fig. 2, drive in front of itself the tobacco supply in the container, and the to-and-fro motion of the rake simultaneously produces a thorough admixing of the cut tobacco, which, of course, consists of various kinds of tobacco.

At a suitable point a bridge 28 is arranged upon the bottom of the tobacco container, which upon the side directed toward the approaching rake is connected with the bottom by means of a gently rising inclined plane 29 and upon the other side through a sharply inclined descending plane 30, while the bridge surface proper is horizontal. The bridge, as shown, in Fig. 2, forms a sector of the container bottom.

Figure 3:
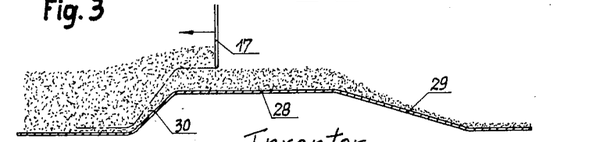
Fig. 3 is a vertical cross section on the line 3—3 of Fig. 2 wherein, however, only the bottom of the container with the tobacco supply resting thereon is illustrated.

As soon as the rake arrives in front of the gentle incline 29, it will be gradually lifted by means of the control lever 8 until it attains a height, such as is shown in Fig. 3, wherein the ends of the prongs of the rake are located at a desired spacing above the horizontal surface of the bridge. It is clear that in this manner a layer of tobacco is formed upon the bridge which embodies a distribution of tobacco as uniform as possible due to the fact that the rake in its rotation simultaneously is moved to and fro longitudinally, whereby the upper surface of this layer by means of the rake is scraped to an exact level. Upon further motion, the rake again drops to correspond with the steeper inclined plane 30, in the manner shown in the dot and dash lines in Fig. 3, until the ends of its prongs again arrive in the vicinity of the bottom of the container. Thus upon each rotation, a uniform layer of tobacco of perfectly defined height is formed upon the bridge 28.

Figure 4:
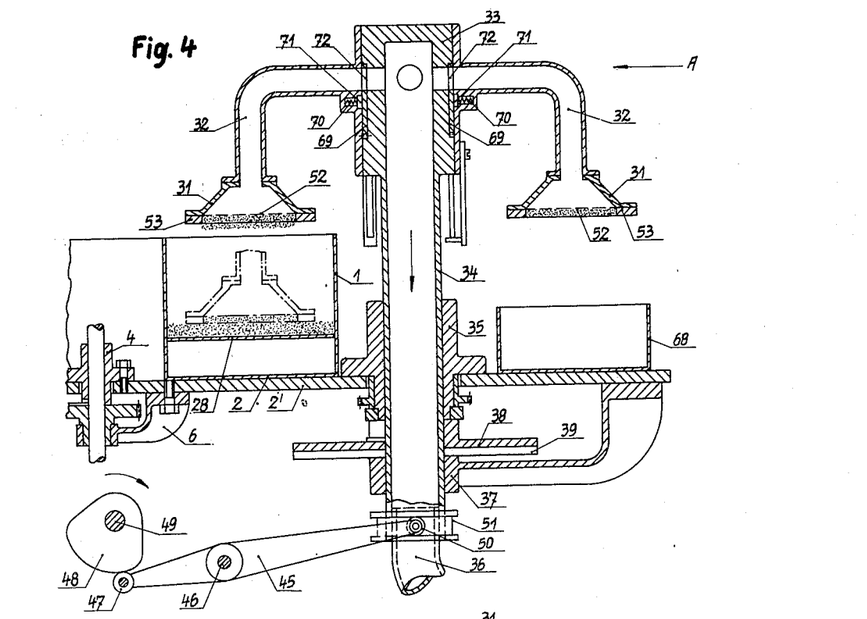
Fig. 4 is a vertical cross section through the suction head carrier, wherein only the portion of the tobacco container specificaly concerned is illustrated.
Figure 5:
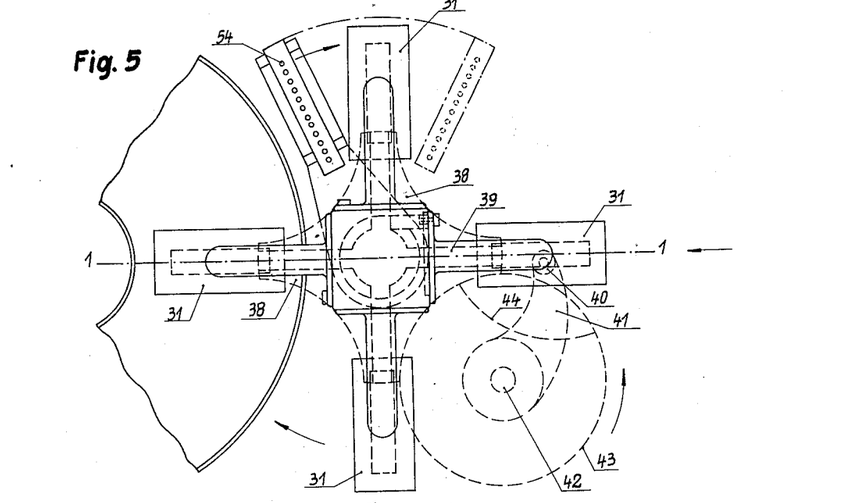
Fig. 5 is a top plan view of the suction head carrier.

As Figs. 4 and 5 show, four suction heads 31 with connected air suction conduits 32 are arranged in star formation upon a carrying head 33. The carrying head is continued as a hollow tube 34 which passes perpendicularly down, and which is rotatably and longitudinally shiftable in the bearing 35, and upon the lower end of the hollow tube is connected the flexible air suction conduit 36, and also a second guiding bearing 37.

The rotation of the suction head carrier takes place step by step, since a Geneva gear 38 is keyed to the hollow tube 34 below the bearing 35, the individual arms of which have radial grooves 39 upon their under sides. A roller 40 of a Geneva gear drive may engage in the grooves 39, said roller being carried by the connecting arm 41, upon the shaft 42 upon which the usual locking disc 43 with the notch 44 is arranged.

The rising and falling of the suction head carrier takes place through a control lever 45, which is pivoted about the frame bolt 46 and cooperates by means of a roller 47 provided upon its end, with a cam disc 48, which is secured to the shaft 49, and rotates in the direction of the arrow. The other forked end of the control lever engages by means of roller 50 in an annular groove 51 which is provided upon the lower end of the hollow tube 34.

The step by step rotation of the suction head carrier is so aranged, that each time after the termination of a partial rotation a suction head 31 is located above the tobacco container 1 in the vicinity of the bridge 28. While the rotation of the suction head carrier is stopped, a descent of the suction head carrier by the control lever 45 is produced, so that the suction head which is located above the container 1 descends upon the supply of tobacco, which happens to be upon the bridge 28. Each suction head 31 terminates in a sieve 52 which forms the bottom of a chamber connected to the suction head, which opens downwardly and which is limited by the side walls 53. The depth of this chamber is so chosen that it is exactly correct for retaining such volume of tobacco as is necessary to form one filler, and the strength of the current of suction air going through the conduit 32 is so controlled that the chamber will at least certainly be sucked full of tobacco.

Figure 11:
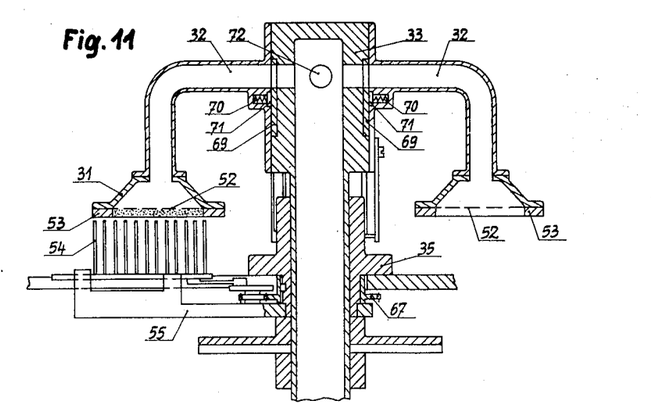
Fig. 11 shows the suction head carrier in vertical section in the position where the rake cooperates with the suction head chamber.
Figure 12:
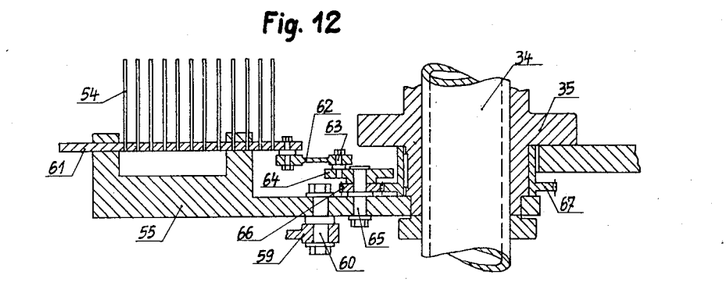
Figs. 12 and 13 show upon an enlarged scale and in vertical section and top view, respectively, the smoothing rake with its controlling means.
Figure 13:
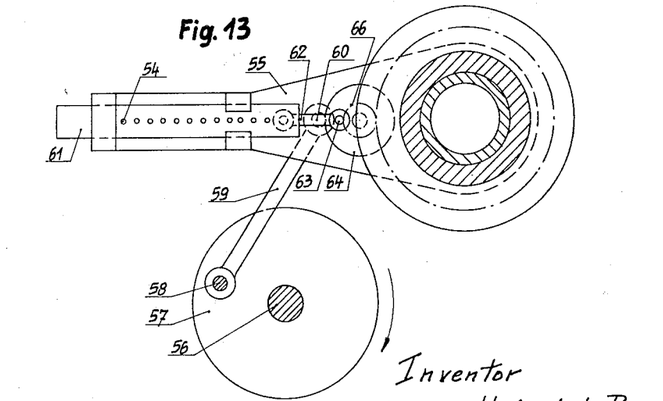

If this has occurred, then the control lever 45 again lifts up the suction head carrier into the position shown in Fig. 4. Now, a stepwise rotation takes place by means of the Geneva gear drive, whereby the suction head, together with its filled chamber is brought into the vicinity of a smoothing rake, which is clearly shown in detail in Figs. 11 to 13. This smoothing rake has prongs 54 which extend vertically upward. It is carried by an oscillating arm 55 which surrounds the bearing element 35 of the hollow tube 34, by means of a pivot strap, so that the arm may be turned about the hollow tube and/or its bearing element 35. This oscillation is provided by means of a crank drive, there being a crank disc 57 secured upon the shaft 56, which is rotated in the direction of the arrow by any means not shown. The connecting rod 59 is set upon the crank pin 58 carried by the disc, which engages at its other end 60 in the under side of the oscillating arm 55. The oscillating arm will therefore be turned to and fro about the hollow tube 34. Thereby the descent of the suction head carrier 33 takes place to such extent that the upper ends of the prongs of the rake just reach to the open closure surface of the suction head chamber, which is filled with tobacco. The prongs thus smooth off the tobacco, so that all projecting fragments of tobacco are removed, whereby the particles located in the chamber remain under the influence of the air suction. In order to increase the smoothing action the foot of the rake is formed as a slide 61 radially supported to be shiftable upon the arm 55. The radial shifting of the rake is provided by means of a connecting rod 62, whose crank pin 63 is carried by the crank disc 64. The crank disc 64 is supported to be freely rotatable upon a stud 65, which is carried by the rotary arm 55. A spur wheel 66 is rigidly secured with the crank disc, and is in mesh with a stationary spur wheel 67, which is keyed upon the bearing 35. Upon the to-and-fro oscillation of the oscillating arm 55 the spur wheel 66 rolls upon the stationary spur wheel 67, whereby the crank disc 64 is moved to and fro, and thereby gives the longitudinal shifting motion to the rake slide 61.

A further shifting of the suction head carrier 33 takes place, whereby the suction head, together with the smoothed portion of tobacco filler is brought to that position where the supply of tobacco is to be delivered. This may take place directly to the means for further shaping the tobacco filler. In the embodiment shown, however, a receiving container 68 is provided for this purpose. If the tobacco is to be taken off from the chamber of the suction head, then the current of suction air in the corresponding conduit 32 must be shut off. This is done as follows:

A valve disc 69 is provided in the suction head carrier 33, into which each conduit 32 opens. The valve discs are pressed tightly against the suction surface, which in horizontal section has a rectangular profile, by means of springs 70, whereby the springs press against the pivot stud 71 of each disc. Each disc has a circular perforation 72 which ordinarily is in register with the opening of the corresponding suction air conduit 32. A portion of each disc 69 is provided at its periphery with teeth 73, and these teeth are in mesh with a rack bar 74, which is always drawn downwardly by means of the spring 75. The rack bar is guided vertically in a groove 76 of the suction head carrier 33 and its lower end abuts, in the position shown in Fig. 9, upon a stop rod 77, which is carried by a strip 78 secured to the suction head carrier 33. The lower end of the rack bar continuation, which abuts against the stop 77, is as shown in Fig. 9a, shaped to extend to both sides, and the stop 77 lies under the center of the extensions.

If, now, the suction head carrier 33 descends, which of course must take place upon each step by step rotation of the suction head carrier, then the under end of the continuation of the rack bar abuts against a rigid stop 79, which is secured to the frame. This stop is forked, as shown in Fig. 9a, in order to allow the stop 77 to pass therethrough. However, it will hold back the rack bar, so that it will come into the position shown in Fig. 10. Thereby the valve disc 69 will be turned, so that its opening 72 will leave the vicinity of the opening of the corresponding suction conduit of the corresponding suction head. The suction conduit will thus be shut off, so that the supply of tobacco located in the chamber of this suction head may fall down into the container 68.

Of course, only a single stop 79 is provided. Upon the return motion of the suction head carrier 33 into its elevated position the spring 75 draws the valve disc 69 back into its original position automatically.

Figure 6:
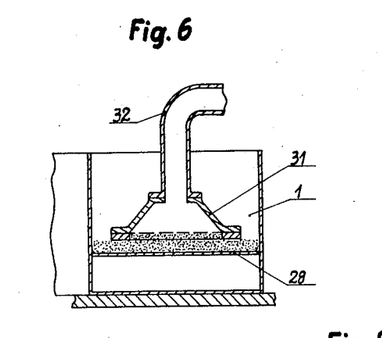
Figs. 6 to 8 show the various positions of the suction head in vertical cross section.
Figure 7:
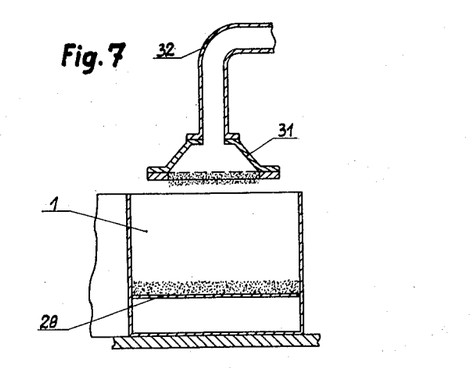
Figures 8, 9, 9A, 10:
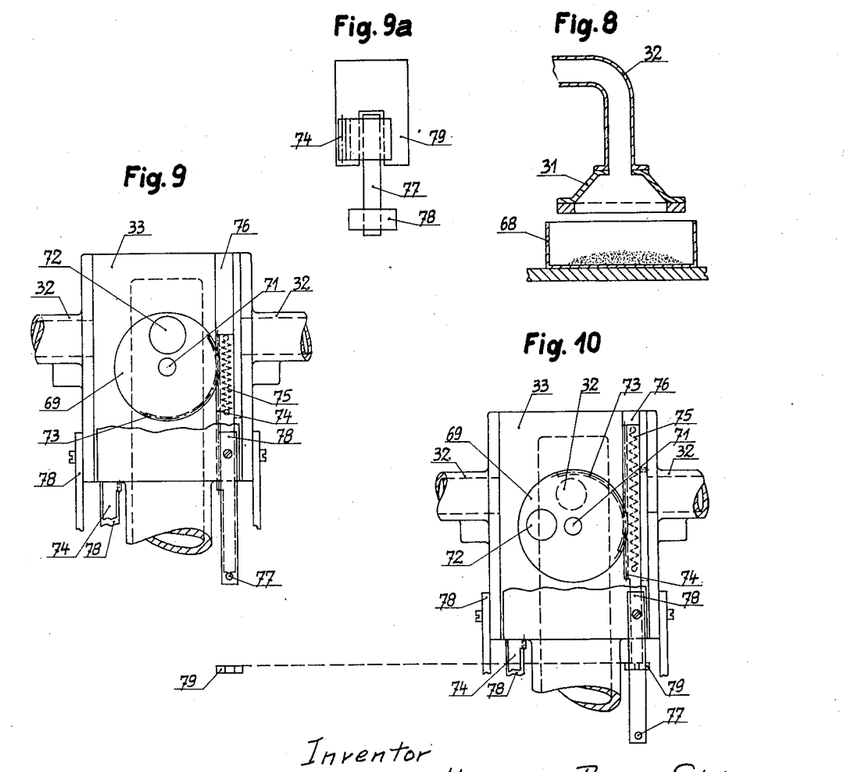
Figs. 9 and 10 show in accordance with Fig. 4, with the omission of an air suction conduit 32, seen in the direction of the arrow, two different positions of the controlling means of the valve, which is provided in each air suction conduit upon the carrier.
Fig. 9a is a partial view of Figure 9 as seen from above.

Figs. 6 to 8 show the three principal positions of the suction head 31, and Fig. 6 shows the position wherein the suction head has descended upon the tobacco layer on the bridge 28. Fig. 7 shows the position wherein the suction head emerges upwardly out of the container 1 with a filled chamber and Fig. 8 shows the position wherein the suction head after shutting off the suction air current has discharged the tobacco supply from its chamber into the container 68.

Figure 14:
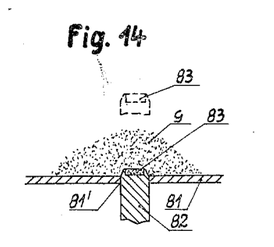
Fig. 14 shows a very simple arrangement in vertical cross section, Fig. 15 likewise shows a somewhat more elaborate arrangement, likewise in vertical cross section.

In the embodiment shown in Fig. 14, the supply of material G is poured upon the table 81. The plunger 82 is guided in an opening 81' of the table, the upper end of said plunger being provided with the hollow vessel in the shape of a circular cavity 83. If, now, the plunger 82 be moved upwardly then the cavity 83 will fill with the material, as the dotted position shows. If, now, the material be removed from the cavity 83 in this position, then upon descending and/or again returning upwardly, it will fill anew with material, whereby as long as the supply reaches a considerable height above the table 81, the cavity will nearly always contain the same volume of the material.

Figure 15:
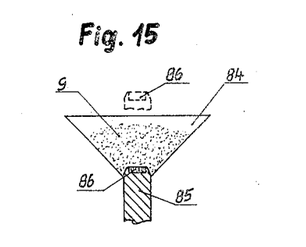

A somewhat more practical arrangement is shown in Fig. 15. Here the material G is poured into a funnel-shaped vessel 84. Upon its bottom, which terminates in a point, an opening is provided in the funnel-shaped vessel 84, wherein a plunger 85 is guided. The plunger 85 also carries a cavity 86 upon its upper end which in its upper travel fills with the material.

If, now, the material be removed from the cavity 86 in the upper position shown in dotted lines, and the plunger 85 moved downward, then the cavity will fill anew with material. This may now be repeated as long as the supply in the funnel-shaped vessel 84 lasts and suffices to fill the cavity 86. For this purpose the funnel-shaped arrangement is particularly advantageous, because thereby it is possible to provide a complete filling of the cavity even with only a small supply.

In the embodiment shown in Figs. 16 to 19, a funnel-shaped vessel forms the basis as in the embodiment according to Fig. 15. This is here formed of a fabric 87 which is secured at its upper edge to a circular frame 88. The bottom edge 87' of the fabric is connected with a hollow plunger 89 which is connected with a suction air conduit, and the upper end of which is covered by an air permeable bottom 90 (sieve or the like). The hollow plunger 89 is connected by means of a rod 89' with a lever 91 which is controlled by a cam disc 92. If, now, the hollow plunger be lifted by the lever 91 into the position shown in Fig. 17, so that the upper end of the same protrudes from the supply of tobacco, then the hollow vessel 90' provided upon the upper end of plunger 89 will have become filled at least to the edge with the tobacco found in the supply funnel 87, whereby the air suction current provides for a constantly uniform density of the amount of tobacco taken up.

In order to strip off the tobacco which projects above the rim of the vessel, a rake 93 is provided which is arranged to be longitudinally shiftable upon its carrier 94. A rod 96 engages upon a bolt 95 of the rake 93 and is driven to and fro by means of an eccentric 97. The carrier 94 is arranged with its eyes 94' upon the shaft 98, upon which the eccentric 97 and the pulley 99 connected thereto are arranged to be loosely rotatable. The gear wheel 100 is located upon the lower end of the shaft 98 and meshes with gear segment 101. The gear segment 101 is arranged upon a lever 102, which is supported to swing about the bolt 103 and which is drawn by means of a spring 104 to keep its end 105 which is provided with a roller against a controlling disc 106.

Figures 16, 17:
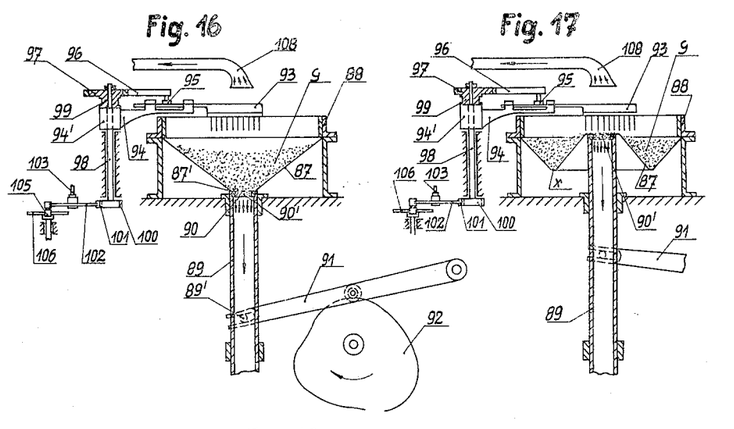
Figs. 16 and 17 are vertical cross sections of a modification in various working positions of the hollow vessel.
Figure 18:
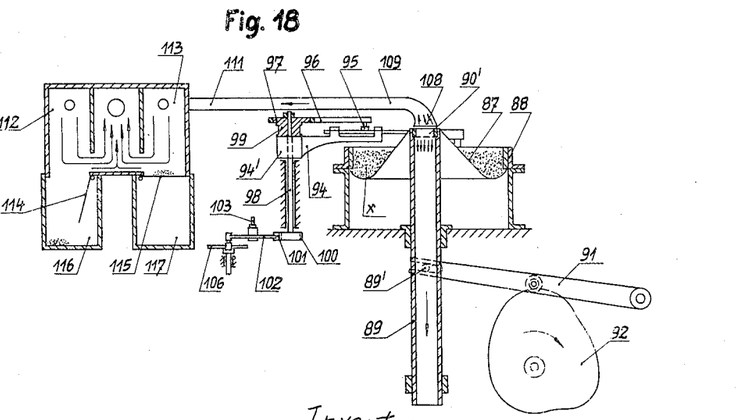
Fig. 18 shows in addition the further passing on in said modification of the separated portion of material.
Figure 19:
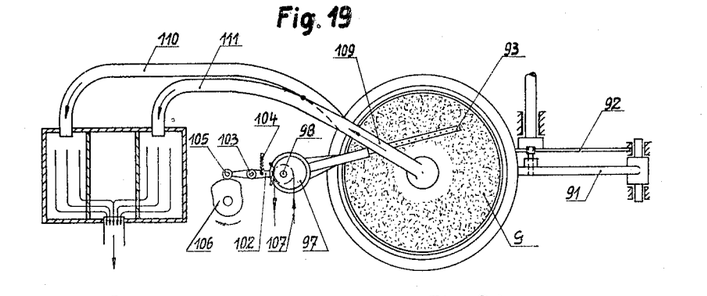

If, therefore, the hollow plunger 89 is brought into the position shown in Fig. 17, then the rake carrier with the rake 93 is passed by means of the cam 106 over the hollow vessel 90', whereby the rake during the stripping off is moved to and from by the eccentric disc 97 transversely to its direction of motion. The driving of the eccentric disc 97 here is provided by means of the drive belt 107, which passes over the pulley 99. After the rake has in this manner been passed one or more times over the filled hollow vessel, the latter returns to its position of rest, which is shown in Fig. 19. Now the hollow plunger 89 goes further into the position shown in Fig. 18, so that the vessel 90' filled with the determined amount of tobacco will become positioned in front of a suction head 108. As soon as the hollow vessel has reached this position, the air suction current acting through the hollow plunger 89 will be shut off and/or changed to compressed air, so that the suction head 108 may remove the tobacco portion from the vessel 90' and the same can be passed through the conduit 109 to the place where it is to be treated further.

In this embodiment the tubular conduit 109 is in communication with two branches 110 and 111, through which the tobacco may be alternately passed into the chamber 112 or 113. The chambers 112 and/or 113 are in a well known manner made correspondingly wider than the cross sections of the tube 110 and/or 111, in order that the sudden decrease of velocity of the air may produce the discharging of the tobacco upon the trap doors 114 and/or 115, from which the tobacco may be delivered into the preliminary filler pressing conduits 116 and/or 117.

As soon as the tobacco has been removed from the vessel 90', the hollow plunger 89 will be brought by the cam disc 92 downwardly into the position shown in Fig. 16, whereby the tobacco located in the annular conduit x (see Figs. 17 and 18) rolls and/or falls downwardly to the vessel. In this way the tobacco will be subjected to an intimate stirring.

Figures 20, 21, 22, 23:
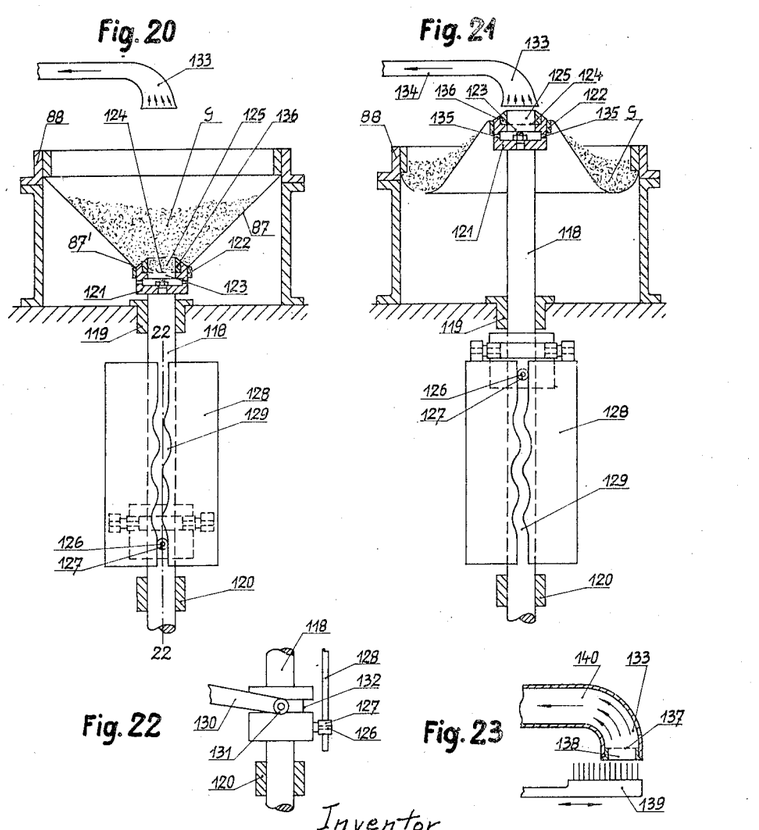

In the embodiment shown in Figs. 20 to 22, the tobacco material G again is located in a funnel-shaped container 87 made of fabric and the upper rim of which again is fastened into an annular frame 88. The plunger 118 engages in the lower part of the container 87 and is guided in the guides 119 and 120.

The lower part 87' of the sack-like container 87 is secured by means of a ring 122 to the head piece 121 of the plunger 118. This head piece is provided with a central door 123, into which is set an air permeable bottom 124, so that the tobacco falling from above into the container 125 thus formed will be carried by the bottom 124.

Further, a bolt 126 is provided upon the plunger 118, upon which bolt is located the roller 127. This roller 127 is guided in a cam track 129 provided upon the frame member 128, so that during the ascent of the plunger 118 the same is subjected to a to and fro rotation. Note particularly in this connection also Fig. 22, which represents a partially vertical cross section of the arrangement on line 22—22 of Fig. 20. The guiding up and down of the plunger 118 is accomplished by a lever 130 which engages in the annular groove 132 upon the plunger 118 by means of its roller 131. The plunger 118, therefore, in travelling upwardly into the position shown in Fig. 21 is given a to and fro rotation about its axis, whereby the fragments of tobacco lying upon the rim of the vessel 125 will be thrown outwardly by the centrifugal action.

If, therefore, the vessel 125 has arrived in front of the suction head 133, then the same will be put into action and the tobacco located in the vessel 125 will be carried off through the passage 134. In order to make possible a sucking out of the contents of the vessel as complete as possible, the chamber located below the air permeable bottom 124 is put in communication with the outer atmosphere by means of radial bores 135.

In order to be able to use one and the same apparatus for dispensing portions of various amounts, the annular insert 136 is interchangeable.

Fig. 23 shows a form deviating somewhat from the embodiment shown in Figs. 20 to 22. Here the forward portion of the suction head 133 is covered with a sieve 137, so that a chamber 138 opening downwards is formed. The tobacco is first taken up out of the chamber 125 by means of this chamber 138 and after the plunger 118 is returned, it is struck off by means of a rake 139 which acts similarly to the rake 93 shown in Figs. 16 to 19. After the rake has been passed one or more times under the lower surface of the portion of tobacco carried by the air current, the discharge tube 140, upon which the suction head 133 is located, is swung over a conveyor or vessel, into which the tobacco is then delivered after shutting off the air suction for further treatment.

It is of course evident that the invention may have a plurality of modifications and it is the intention to claim all such modifications as may be reasonably included within the scope of the following claims.

I claim:

1. In a device of the class described, a container for a tobacco supply, a suction head, a carrier for said suction head, means for moving said suction head toward and away from said tobacco supply, a chamber in said suction head in which a predetermined amount of tobacco from said supply is held, means for removing any tobacco protruding from said chamber, a crank mechanism for oscillating said removing means, and means for reciprocating said removing means.

2. A device as claimed in claim 1 in which a guide is provided in which said removing means can slide and the means for reciprocating said removing means includes a stationary spur wheel mounted upon said carrier, another spur wheel co-operating with said first mentioned spur wheel, and a crank connected thereto and to said removing means.

3. In a device of the class described a cylindrical container for a tobacco supply, a suction head, a radially positioned rake reaching to near the bottom of the container, means for moving said rake around in said container, the bottom of said container having a bridge thereon with a horizontal surface, and means for lifting the rake gradually over said bridge during its rotation to such an extent that a uniform layer of tobacco remains upon the surface of the bridge to be acted upon by said suction head.

4. A device in accordance with claim 3 in which means are provided for giving the rake a radial to and fro motion during its passage over the bridge and said bridge is provided upon both sides with inclined rising surfaces.

5. A device in accordance with claim 3 in which a plurality of suction heads are provided arranged in star fashion, a carrier for said suction heads, a centrally arranged suction conduit connected to said carrier, means for rotating said carrier, means for longitudinally reciprocating said carrier, said rotating means including a Geneva gear for advancing said carrier step by step, a valve in the connection of the air suction with each individual suction head conduit, a spring for holding said valve in open position, and means for closing said valve including a stationary stop operative upon depression of the suction head carrier when the corresponding suction head has reached the position where it discharges the tobacco supply carried along thereby.

6. A device in accordance with claim 3 in which a chamber is provided in the suction head suitable to correspond to the quantity of tobacco required for one filler which is to be taken up thereby, a rake with which the suction head during its passage to the point of delivery comes into engagement, and means for reciprocating and oscillating said rake past the opening of said chamber and thereby accurately smooth off the tobacco located in the chamber.

FRANZ HEINRICH BENNO STELZER.